United States Patent Office 3,644,644
Patented Feb. 22, 1972

3,644,644
METHODS OF ANESTHETIZING MAMMALS WITH
N-(TERTIARY AMINO-ALKYL)-BENZAMIDES
Michel Leon Thominet, Paris, France, assignor to Societe d'Etudes Scientifiques et Industrielles de l'Ile-de-France, Paris, France
No Drawing. Original application June 19, 1968, Ser. No. 738,123. Divided and this application Jan. 12, 1971, Ser. No. 105,940
Claims priority, application France, June 20, 1967, 111,225; Sept. 5, 1967, 120,026
Int. Cl. A61k 27/00
U.S. Cl. 424—324
5 Claims

ABSTRACT OF THE DISCLOSURE

The methods of this invention utilize certain N-(tertiary amino-alkyl)-benzamides. Such benzamides are significantly more potent than cocaine, xylocaine and procaine in anesthetizing mammals. They may be administered in the form of tablets, ampoules or aerosols.

This application is a division of the pending application Ser. No. 738,123, filed June 19, 1968, now U.S. Patent 3,591,634.

This invention relates to new N-(tertiary amino-alkyl)-benzamides, their pharmaceutically acceptable salts, processes of producing such benzamides, and methods of using them as anesthetics for mammals.

The benzamides of this invention have the following formula:

(I)
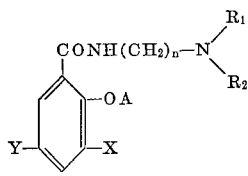

in which $n$ is a whole number from 1 to 3; A is a monovalent radical derived from an unsaturated hydrocarbon having one double or one triple bond of low molecular weight, desirably, having less than 10 carbon atoms and preferably less than 5 carbon atoms; X and Y are hydrogen, halogen, amino, mono lower alkyl amino or di lower alkyl amino; $R_1$ and $R_2$ are identical or different lower alkyl, preferably of 1 to 5 carbon atoms, or a 5 or 6 membered heterocyclic nitrogenous organic nucleus formed with the nitrogen atom of Formula I above and derived from heterocyclic compounds, such as morpholine, piperidine, pyrrolidine, piperazine, N-alkylpiperazine or imidazole. X and Y may be the same or different. When X or Y is a mono lower alkyl amino or di lower alkyl amino, the lower alkyl group preferably contains less than 5 carbon atoms, such as methyl, ethyl, isopropyl or n-butyl. When X and/or Y are halogen, they may be the same or different, such as chlorine, bromine or iodine.

Examples of the monovalent radical A are those derived from ethylene hydrocarbons, such as ethylene, propylene and ethyl ethylene, acetylenic hydrocarbons, such as methyl acetylene and butine-1 and cyclo alkenes, such as cyclo heptene.

Examples of pharmaceutically acceptable salts of the N-(tertiary amino-alkyl)benzamides are acid addition salts of the base with a mineral or organic acid such as hydrochloric acid, hydrobromic acid, hydroiodic acid, phosphoric acid, sulfuric acid, citric acid, tartaric acid, lactic acid, acetic acid or ethane sulfonic acid; quaternary ammonium salts obtained by reacting the benzamides with an aliphatic or aromatic alkylating agent, such as methyl chloride, methyl bromide, methyl iodide, dimethyl sulfate, methyl benzene sulfonate, methyl p-toluene sulfonate, ethyl bromide, propyl bromide or benzyl chloride.

The N-tertiary (amino-alkyl)benzamides of this invention are produced by reacting with thionyl chloride a benzoic acid having the formula:

(II)
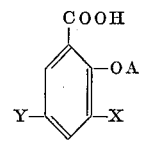

in which A, X and Y have the same meaning as heretofor defined for Formula I above, and reacting benzoyl chloride with an amine having the formula:

(III)
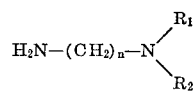

in which $n$, $R_1$ and $R_2$ have the same meaning as defined in Formula I above.

A more comprehensive understanding of this invention is obtained by reference to the following examples.

EXAMPLE I

N-(diethylaminoethyl)-2-alloyloxy-3,5-dibromo-benzamide

In a 500 ml. flask equipped with reflux refrigerant are placed 132 g. of thionyl chloride and 62 g. of 2-allyloxy-3,5-dibromobenzoic acid. The mixture is heated slowly in a water bath at 40° C. and then at 58° C. until it is completely dissolved. The mixture is cooled and 62 g. of acid is added. It is heated at 40° C., then at 70° C. until it is completely dissolved (about two hours). The excess thionyl chloride is then distilled off under vacuum, the temperature being maintained at 70° C.

131 g. of 2-allyoxy-3,5-dibromobenzoyl chloride are obtained. (Yield: about 100%) (M.P.: 42–43° C.).

Into a one liter flask equipped with an agitator, a thermometer and an ampoule of bromine, there is introduced 43 g. of N,N-diethylamino-ethylamine and 100 ml. of methylethylketone. A solution of 131 g. of 2-allyloxy-3,5-dibromobenzoyl chloride dissolved in 100 ml. of methylethylketone is poured in, drop by drop, the temperature being maintained between 5° and 10° C. The mixture is agitated for 30 minutes at 10° C., then allowed to stand at room temperature for two to three hours.

The solution is then recovered in 800 ml. of water and the methylethylketone is completely removed by distillation. The solution is treated with animal charcoal and the base is precipitated by a calculated quantity of sodium hydroxide. It is extracted in ether, the ether extract is washed with water and dried.

The ether extract is distilled to a constant weight. 131 g. of N-diethylaminoethyl) - 2 - allyloxy-3,5-dibromobenzamide are obtained. (Yield: 81%.)

To obtain the phosphate of N-(diethylaminoethyl)-2-allyloxy-3,5-dibromobenzamide, 131 g. of the base obtained is dissolved in 300 ml. of methyl alcohol. To this solution is added a solution of 36 g. of 85% phosphoric acid in 70 ml. of methyl alcohol. The phosphate crystallizes. It is dried, washed in methyl alcohol and dried again.

There were obtained white crystals of phosphate of N-(diethylaminoethyl) - 2 - allyloxy-3,5-dibromobenzamide. (Yield: 73%) (M.P.: 72–73° C.)

EXAMPLE II

N-(ethylpropylaminoethyl)-2-allyloxy-3,5-dibromobenzamide

Into a one liter flask equipped with an agitator, a thermometer and an ampoule of bromine, there is placed 36.5 g. of N,N-ethyl-propylethylene diamine and 100 ml. of methylethylketone which is cooled at +5° C.

Then there is poured, drop by drop, a solution of 100 g. of 2-allyloxy-3,5-dibromobenzoyl chloride (prepared as described in the preceding example) dissolved in 100 ml. of methylethylketone, the temperature being maintained between 5 and 10° C. The mixture is maintained under agitation for 30 minutes at 10° C., then allowed to stand at room temperature for 2 to 3 hours.

The solution is then recovered in 800 ml. of water and the methylethylketone is completely removed by distillation. The brown solution obtained is treated with animal charcoal. The base is then precipitated with a calculated amount of sodium hydroxide. It is extracted in ether, the ether solution is washed in water and dried. The ether is completely removed.

117 g. of N-(ethyl-propylaminoethyl)-2-allyloxy-3,5-dibromobenzamide are obtained. (Yield: 93%.)

The base obtained is dissolved in 190 ml. of absolute alcohol. 30 g. of oxalic acid are added. The oxalate crystallizes. After cooling, it is washed in alcohol, then in ether, and then dried at 40° C. After successive recrystallizations with isopropanol, 57 g. of N-(ethyl-propylaminoethyl)-2-allyloxy - 3,5 - dibromobenzamide oxalate are obtained. (Yield: 43%) (M.P.: 118–119° C.)

EXAMPLE III

N-(piperidinoethyl)-2-allyloxy-3,5-dichlorobenzamide

Into a 250 ml. flask equipped with a reflux refrigerant, 87 g. of thionyl chloride and 45 g. of 2-allyloxy-3,5-dichlorobenzoic acid are introduced. The mixture is heated slowly in a water bath until it is totally dissolved. It is allowed to cool and 45 g. of the acid is added. It is refluxed for about six hours. The excess thionyl chloride is distilled under vacuum. 97 g. of 2-allyloxy-3,4-dichlorobenzoyl chloride are obtained which crystallizes and are immediately dissolved in 60 ml. of methylethylketone.

Into a 2 liter flask equipped with an agitator, a thermometer and an ampoule of bromine, 47 g. of piperidinoethylamine dissolved in 650 ml. of methylethylketone are introduced. There is then poured in the solution of acid chloride previously prepared, the temperature being maintained between 0 and 5° C.

When the reaction is complete, the mixture is filtered, washed on the filter twice with 30 ml. of methylethylketone and dried at 50° C. 75 g. of N-(piperidinoethyl)-2-allyloxy-3,5-dichlorobenzamide hydrochloride are obtained. (Yield: 50.6%) (M.P.: 163–165° C.)

EXAMPLE IV

N-(diethylamino-ethyl)-2-propargyloxy-3,5-dibromobenzamide

Into a 250 ml. flask equipped with a reflux refrigerant, 28.6 g. of thionyl chloride and 13.5 g. of 2-propargyloxy-3,5-dibromobenzoic acid are introduced. It is heated in a water bath at 40° C. until it is completely dissolved (two hours). It is cooled, and then 13.5 g. of the acid is added. It is heated at 40° C. and then at 70° C. in order to obtain complete dissolution (1½ hours). The excess thionyl chloride is removed under vacuum. 28 g. of 2-propargyloxy-3,5-dibromobenzoyl chloride are obtained.

Into a 1 liter flask equipped with an agitator, a thermometer and an ampoule of bromine, 9.2 g. of N,N-diethyl-aminoethylamine in 30 ml. of anhydrous methylethylketone are introduced. 28 g. of acid chloride dissolved in 80 ml. of methylethylketone are poured in drop by drop, the temperature being maintained between 5° and 10° C. The mixture is agitated for ½ hour at 10° C., then allowed to stand at room temperature for 2 to 3 hours. The solution is then recovered in 200 ml. of water. The methylethylketone is removed under vacuum. The solution is treated with animal charcoal, is filtered and the base is precipitated by a calculated quantity of sodium hydroxide. It is filtered, washed in water and dried at 40° C.

15 g. of N-(diethylamino-ethyl)-2-propargyloxy-3,5-dibromobenzamide are obtained. (Yield: 43.5%) (M.P.: 54–55° C.)

EXAMPLE V

N-(diethylamino-ethyl)-2-propargyloxy-3,5-dichlorobenzamide

Into a 2 liter flask equipped with an agitator, a thermometer and a reflux refrigerant, there are introduced 195 g. of 2-propargyloxy-3,5-dichlorobenzoic acid, 284 g. of thionyl chloride and a few drops of dimethylformamide. The mixture is heated slowly in a water bath at 40° C. until it is completely dissolved. The reaction is completed in about an hour and a half and the thionyl chloride is completely evaporated under vacuum. 210 g. of 2-propargyloxy-3,5-dichlorobenzoyl chloride are obtained (yield: about 100%), which are dissolved in 500 ml. of methylethylketone.

Into a 2 liter flask equipped with an agitator, a thermometer and an ampoule of bromine, there are introduced 92.3 g. of N,N-diethylaminoethylamine dissolved in 200 ml. of methylethylketone. Then the solution of acid chloride described above is poured in, the temperature being maintained between 0 and 5° C. The mixture is maintained at between 5 and 10° C. under agitation for ½ hour, then at room temperature for 1 hour. The crystals obtained are dried, washed several times with methylethylketone, then dried at 50° C. The product obtained is dissolved in boiling acetone, passed through charcoal and filtered hot. The solution is cooled at 0° C. and, at the end of two hours, the crystals formed are dried, washed in chilled acetone, then dried at 50° C.

There were obtained 170 g. of N-(diethylaminoethyl)-2-propargyloxy - 3,5 - dichlorobenzamide. (Yield: 56%) (M.P.: 110–111° C.)

EXAMPLE VI

Bromomethylate of N-(diethylaminoethyl)-2-propargyloxy-3,5-dibromobenzamide 15.5 g. of 2-propargyloxy-3,5-dibromobenzamide are dissolved in 15 ml. of acetone. 10 g. of methyl bromide dissolved in 20 ml. of acetone are added. The mixture is allowed to stand for 24 hours. Considerable crystallization occurs. It is dried, washed on a filter with chilled acetone, and dried at room temperature.

There were obtained 16 g. of bromomethylate of N-(diethylaminoethyl)-2-propargyloxy - 3,5 - dibromobenzamide. (M.P.: 110° C.)

EXAMPLE VII

Bromomethylate of N-(diethylaminoethyl)-2-propargyloxy-3,5-dichlorobenzamide 24.5 g. of 2-propargyloxy-3,5-dichlorobenzamide are dissolved in 50 ml. of acetone. 16 g. of methyl bromide dissolved in 32 ml. of acetone are added. An immediate crystallization of bromomethylate of N-(diethylaminoethyl)-2-propargyloxy - 3,5 - dichlorobenzamide occurs. The mixture is allowed to stand for 24 hours. It is dried, washed on a filter with chilled acetone and dried at room temperature. (M.P.: 155° C.)

The compositions of this invention have been the subject of pharmacological and clinical studies in order to determine both their non-toxicity and their therapeutic activity.

Acute toxicities studies in the mouse have shown that the toxicity of the compositions of this invention are entirely compatible with their therapeutic use.

For example, the following table is a resume of the toxicities of two compositions of this invention as compared with toxicities of procaine, tetracaine and xylocaine:

| Products | D.L. 50 in mg./kg. (compositions in base condition) | | | |
|---|---|---|---|---|
| | IV | IP | SC | PO |
| N-(diethylaminoethyl)2-allyloxy-3,5-dibromobenzamide | 9.3 | 55.5 | 70.2 | |
| N-(diethylaminoethyl)-2-propargyloxy-3,5-dibromobenzamide | 14 | 76–81 | 108 | 162–182 |
| Procaine | 42.9 | 182 | 450 | 987 |
| Tetracaine | 6.3 | 51 | 29 | 334 |
| Xylocaine | 19.4 | 111 | 166 | 454 |

NOTE.—IV=intravenously; IP=intraperitoneally; SC=subcutaneously; PO=orally.

The local anesthetic properties of the compositions of this invention have been made evident according to the different test described hereafter:

(1) Surface local anesthesia was determined by Regnier's method which consists of studying the suppression of the oculopalpebral reflex in the cornea of the rabbit.

On a group of 10 rabbits, the depth of corneal anesthesia obtained after instilling in the eye two drops of the aqueous solution of the product under study, by comparison of that product with two aqueous solutions of hydrochloride of cocaine in different concentrations. The experiment was conducted in alternate testing one week apart.

The results given in the following tables are examples. The average number per hour of strokes of hair on the cornea producing no reaction indicates the intensity of the anesthesia. A number equal to 1300 corresponds to total anesthesia for 60 minutes. A number equal to 13 corresponds to an absence of anesthesia.

| Products | Concentration, percent | Average hourly number of hair strokes | Equivalence in cocaine of concentration tested, percent |
|---|---|---|---|
| Cocaine | 1 | 943 | |
| N-(diethylaminoethyl)-2-allyloxy-3,5-dibromobenzamide | 0.1 | 1,065 | 1.22 |
| Cocaine | 0.5 | 714 | |

From these results, the local anesthetic efficacy of this composition can be determined in comparison with the efficacy of cocaine.

Products: Index of local surface anesthetic activity
Cocaine _____ 1
N - (diethylaminoethyl)2 - allyloxy - 3,5 - dibromobenzamide _____ 12

(2) Bodily anesthesia has been effectuated by intramuscular injection of the product under study in the sciatic site in the rat. The standard test for anesthesia is the non-contraction of the posterior leg after repeatedly pinching the middle toes with Pean's forceps.

Three lots of ten male rats were treated with increasing concentrations of the anesthetic under study. In each lot the percentage of animals not responding to pinching of the paw was measured which allowed the determination of the efficacious anesthetic dosage 50. Experiments were conducted with two compositions cited in examples of this invention in comparison with xylocaine.

| Products | Concentration in mg./ml. | Percent of anesthesia | C.E.$_{50}$ in mg./ml. base |
|---|---|---|---|
| | Experiment No. 1 | | |
| N-(diethylaminoethyl)-2-allyloxy-3,5-dibromo-benzamide | 2 / 1 / 0.5 | 73 / 53 / 30 | 0.76 |
| N-(diethylaminoethyl)-2-propargyloxy-3,5-dibromo-benzamide | 3 / 1.5 / 0.75 | ¹67 / ¹57 / ¹43 | 1.06 |
| Xylocaine | 8 / 4 / 2 | 73 / 63 / 40 | 2.3 |
| | Experiment No. 2 | | |
| N-(diethylaminoethyl)-2-allyloxy-3,5-dibromobenzamide | 1 / 0.5 / 0.25 | 63 / 37 / 3 | 0.57 |
| N-(diethylaminoethyl)-2-propargyloxy-3,5-dibromo-benzamide | 4 / 2 / 1 | ¹87 / ¹53 / ¹53 | 1.2 |
| Xylocaine | 8 / 4 / 2 | ¹73 / ¹53 / ¹43 | 2.7 |

¹ After 30 minutes.

From these results, the local anesthetic power of these two compositions as compared with that of xylocaine can be seen.

Products: Index of activity
N-(diethylaminoethyl)2 - allyloxy - 3,5-dibromobenzamide _____ 5–5.9
N-(diethylamino-ethyl) - 2-propargyloxy-3,5-dibromobenzamide _____ 2.2–2.25
Xylocaine _____ 1

(3) Research on anesthesia by infiltration was effectuated by intradermal injection in the skin on the back of the guinea pig. The criterion of anesthesia is the suppression of the skin shivers produced by the prick of a pin. The introdermal injections of 0.2 ml. of solution of the products studies were given in increasing concentrations to lots of 10 guinea pigs. The depth of anesthesia was measured in comparison with that of procaine.

| Products | Concentrations in mg./ml. | Average number of pin pricks for 30 minutes | Percent of anesthesia | C.E.$_{50}$ in mg./ml. base |
|---|---|---|---|---|
| N-(diethylaminoethyl)-2-allyloxy-3,5-di-bromo-benzamide | 2.5 / 1 / 0.5 / 0.5 | 34 / 31.45 / 20.15 / 6.75 | 94 / 87 / 56 / 22.5 | 0.37 |
| Procaine | 5 / 2.5 / 1.25 / 0.625 | 26.3 / 18.45 / 12.05 / 0.7 | 73 / 51 / 33 / 2 | 2.3 |

From these results, the index of local anesthetic activity by infiltration of this composition, as compared with that of procaine, can be determined.

Products: Index of local anesthetic activity by infiltration
Procaine _____ 1
N-(diethylaminoethyl) - 2 - allyloxy - 3,5-dibromobenzamide _____ 6.2

The experimental results have been confirmed clinically where the products of this invention have been administered in the form of tablets, ampoules, pomades or aerosols of one of their pharmacologically acceptable salts.

The benzamides of this invention and their pharmaceutically acceptable salts are effective for anesthetizing locally mammals, such as dogs, horses or cats, and may be administered in a manner similar to that of procaine or xylocaine in dosages depending on their comparative index of activity with procaine or xylocaine.

What is claimed is:

1. The method of anesthetizing a mammal which comprises administering to said mammal an anesthetically effective amount of a benzamide or pharmaceutically acceptable salt thereof, said benzamide having the formula:

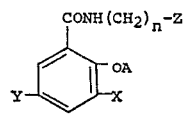

in which $n$ is a whole number from 1 to 3; X and Y are bromo, chloro, iodo, amino, mono lower alkylamino or di lower alkylamino; Z is di lower alkylamino, said alkyls being identical or different, morpholino, piperidino, pyrrolidino, piperazino, N-alkylpiperazino or imidazolo; and A is propargyl or 1-butynyl.

2. The method of claim 1 in which the benzamide is N-(diethylaminoethyl) - 2 - propargyloxy-3,5-dichlorobenzamide.

3. The method of claim 1 in which the benzamide is N-(diethylaminoethyl) - 2 - propargyloxy-3,5-dibromobenzamide.

4. The method of claim 1 in which the pharmaceutically acceptable salt is bromomethylate and the benzamide is N-(diethylaminoethyl) - 2 - propargyloxy - 3,5 - dibromoamide.

5. The method of claim 1 in which the pharmaceutically acceptable salt is bromomethylate and the benzamide is N-(diethylaminoethyl) - 2 - propargyloxy-3,5-dichlorobenzamide.

References Cited

UNITED STATES PATENTS

| 3,177,252 | 9/1965 | Thominet | 260—559 |
| 3,160,557 | 2/1964 | Mauvernay | 260—559 |

FOREIGN PATENTS

| 994,023 | 6/1965 | Great Britain | 260—559 |
| 20,778 | 1961 | Germany | 260—559 |

JEROME D. GOLDBERG, Primary Examiner

U.S. Cl. X.R.

424—248, 263, 267, 274